(12) United States Patent
Osamura et al.

(10) Patent No.: US 6,354,066 B1
(45) Date of Patent: Mar. 12, 2002

(54) APPARATUS FOR STICK-SPEARING STALK-CUT TOBACCO STALKS

(75) Inventors: Kazuo Osamura, Iwate; Akira Takahashi, Kagoshima; Yoshiaki Maekawa, Iwate, all of (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 09/572,457

(22) Filed: May 17, 2000

(51) Int. Cl.[7] ............................................... A01D 45/16
(52) U.S. Cl. ......................................... 56/27.5; 414/26
(58) Field of Search ................................ 56/27.5, 11.9, 56/327.1; 414/26, 501

(56) References Cited

U.S. PATENT DOCUMENTS

| | | | |
|---|---|---|---|
| 2,477,068 A | * 7/1949 | Motte | 56/27.5 |
| 2,495,874 A | * 1/1950 | Stula | 414/26 |
| 3,079,744 A | * 3/1963 | Newswanger | 56/27.5 |
| 3,664,526 A | * 5/1972 | Dilday | 414/508 |
| 3,798,884 A | * 3/1974 | Middleton | 56/27.5 |
| 3,855,762 A | * 12/1974 | Middleton | 56/27.5 |
| 3,902,607 A | * 9/1975 | Middleton | 414/26 |
| 4,444,001 A | * 4/1984 | Thurnau et al. | 56/27.5 |
| 4,510,740 A | * 4/1985 | Foster | 56/27.5 |
| 5,400,577 A | * 3/1995 | Duncan et al. | 56/27.5 |
| 5,454,217 A | * 10/1995 | Williamson | 56/27.5 |

FOREIGN PATENT DOCUMENTS

| | | |
|---|---|---|
| JP | 5541752 | 10/1980 |
| JP | 5546154 | 11/1980 |
| JP | 62115268 | 5/1987 |
| JP | 6366507 | 12/1988 |
| JP | 6366508 | 12/1988 |
| JP | 11127661 | 5/1999 |
| JP | 11127832 | 5/1999 |

* cited by examiner

Primary Examiner—Robert E. Pezzuto
Assistant Examiner—Árpád Fabian Kovacs

(57) ABSTRACT

An apparatus for stick-spearing stalk-cut tobacco stalks which includes an endless belt having a plurality of stick-supporting claws and a plurality of stalk-transferring claws provided along its circumferential surface. The apparatus also includes an air cylinder device and a pushing member for pushing tobacco stalks onto a spear stick, the spear stick being held in place by the stick-supporting claws. Simultaneously with the stick-spearing operations, the endless belt moves forward up to a predetermined distance causing the stalk-transferring claws to move forward and position in equal intervals any tobacco stalks that have been previously speared by the stick.

7 Claims, 8 Drawing Sheets

APPARATUS FOR STICK-SPEARING STALK-CUT TOBACCO STALKS

BACKGROUND OF THE INVENTION

This invention relates to an apparatus for stick-spearing stalk-cut tobacco stalks, which is adapted to be employed for spearing or spearing a stick into the stalk of tobacco and hang-drying the speared tobacco in a curing barn on the occasion of curing harvested tobacco leaf that has been stalk-cut.

The curing of tobacco leaf is generally performed in two different ways, i.e. the method of priming-curing wherein the curing is performed after tobacco leaves that have been harvested one by one are successively knitted into a string; and the method of stalk-cut curing wherein the curing is performed on tobacco stalk that has been reaped with tobacco leaves being kept attached to the tobacco stalk. According to this stalk-cut curing, the stalk-cut tobacco stalk is hanged in a curing barn to perform the curing thereof. Conventionally, the hanging of the stalk-cut tobacco stalk in a curing barn has been performed as follows.

(1) A groove for hanging is formed at first in each of the tobacco stalks that have been stalk-cut using a sickle or a saw, and then, the tobacco stalks are attached one after another through this groove to a pin which has been fixed in advance at predetermined intervals to an upper hanging frame of a curing barn or to a stalk-cut curing net which has been fixed to an upper hanging frame of a curing barn, thus curing the tobacco stalks.

(2) First of all, a peg or a bamboo spit is speared through the tobacco stalk that has been stalk-cut, and then, the tobacco stalks are hanged one after another at predetermined intervals through this peg or bamboo stick in the manner as explained in the aforementioned method (1), thus curing the tobacco stalks.

(3) First of all, a long and slender bar having a length of about 1 to 1.3 m, or so-called stick is speared through each stalk portion of tobacco stalks that have been stalk-cut, and then, this stick spearing a plurality of tobacco stalks is hanged on a hanging frame of a curing barn, thus curing the leaves of the tobacco stalks.

According to any of these methods, tobacco stalks reaped are required to be manually treated one by one, thus demanding considerable labor or making it a main problem in the stalk-cut curing.

Under these circumstances, there are proposed several methods wherein the operation of spearing the stick through the stalk portion of tobacco stalks as set forth in the aforementioned method (3) is performed by mechanical means. For example, Japanese Patent Publication S63-66507 discloses a mechanism wherein a predetermined number of tobacco stalks are fixed at predetermined intervals on a table, and then, a stick is introduced laterally so as to spear the stalk portions of these tobacco stalks. Further, Japanese Patent Publication S55-46154 discloses a mechanism wherein a stick is fixed in advance to a table, and then, the stalk portions of tobacco stalks are introduced to the stick so as to allow the stalk portions of tobacco stalks to be successively speared by the stick.

The mechanism of laterally introducing a stick so as to spear the stalk portions of these tobacco stalks that have been fixed in advance to a table as set forth in the aforementioned Japanese Patent Publication S63-66507 is required to be executed while placing an apparatus in a specific working shop. Therefore, the tobacco stalks reaped at a field are required to be transported to the working shop. Moreover, a careful operation is required so as not to damage the tobacco leaf during the transportation thereof. Furthermore, according to this mechanism, since the stick is laterally introduced so as to spear the tobacco stalks secured on the table, the width of working space is required to be at least twice as large as the length of the stick to be employed. Additionally, since the stick is designed to be continuously laterally transferred in this mechanism, a complicated guiding mechanism as well as a precise operation is required in order to allow the stick to be accurately speared through the center of tobacco stalk.

The mechanism of introducing the tobacco stalks in the lateral direction to a stick that has been fixed in advance to a table so as to allow the stalk portions of tobacco stalks to be successively speared by the stick as set forth in the aforementioned Japanese Patent Publication S55-46154 is advantageous in that the apparatus can be miniaturized as a whole, and that the apparatus can be brought directly into a field and mounted on a vehicle so as to enable the tobacco stalks being reaped from the field to be speared in situ by the stick carried on the apparatus while moving forward the apparatus. As a result, the aforementioned inconvenience of transporting the tobacco stalk to a working shop can be avoided. However, the apparatus set forth in Japanese Patent Publication S55-46154 is designed such that a pushing member for moving the stalk portion of tobacco stalk along the stick is enabled to be moved forward by the normal rotation of a motor so as to transfer a tobacco stalk up to a predetermined distance along the stick, after which the pushing member is moved back to the initial position by the reverse rotation of the motor in order to prepare for the transfer of the next tobacco stalk up to a predetermined portion close to the position of preceding tobacco stalk through the normal rotation of the motor.

Therefore, it is required, in order to realize an array of equidistant intervals of tobacco stalks, to gradually and equidistantly reduce the transferring distance of tobacco stalk (i.e. the moving distance of the pushing member) in every forward movement of the pushing member, thus making the control system of the apparatus very complicated. If there is a case where the apparatus fails to realize an array of equidistant intervals of tobacco stalks, the intervals of the tobacco stalks are required to be readjusted manually by an operator. Further, since the stand-by time for the next spearing of tobacco stalk varies always, the operator is always annoyed. Furthermore, since the total moving distance of the pushing member which is required for spearing a predetermined number of tobacco stalks per stick becomes fairly large as a result of the aforementioned complicated mechanism, the operation of attaching the tobacco stalks to one stick takes a fairly long time.

BRIEF SUMMARY OF THE INVENTION

Therefore, an object of the present invention is to provide an apparatus which is capable of overcoming the aforementioned problems which are involved in the mechanism of introducing the tobacco stalks to a stick that has been fixed in advance to an apparatus so as to allow the stalk portions of tobacco stalks to be successively speared by the stick.

More specifically, an object of the present invention is to provide an apparatus for stick-spearing stalk-cut tobacco stalks, which enables a predetermined number of stalk-cut tobacco stalk to be easily speared by a stick within a short period of time, and is capable of easily arraying tobacco stalks at equidistant intervals and at the same time, capable of easily changing the intervals.

With a view to achieve the above object, the present invention provides an apparatus for stick-spearing stalk-cut tobacco stalks which comprises;

an endless belt rotatably wound around a frame and provided along a circumferential surface thereof with a plurality of stick-supporting claws and a plurality of stalk-transferring claws;

a stick rear end-holding means for fixing a rear end of the stick supported by said stick-supporting claws to said frame; and an actuator provided with a movable member which can be reciprocatively moved a predetermined distance while retaining a parallel state thereof with said stick supported by said stick-supporting claws;

wherein said actuator is designed to be operated in such a way that when said movable member is advanced toward said stick supported by said stick-supporting claws, said stalk-cut tobacco stalk is pushingly transferred allowing a stalk portion of said stalk-cut tobacco stalk to be speared by a distal end of said stick and at the same time, said endless belt is caused to move forward up to a predetermined distance, thereby enabling the preceding stalk-cut tobacco stalk(s), if any, that has already been speared by said stick to advance up to a predetermined distance by means of said stalk-transferring claws.

According to this apparatus, by way of advancing movement of the movable member of the actuator, a stalk-cut tobacco stalk is caused to be pushingly transferred toward the distal end of the stick that has been fixedly secured, thereby allowing the stalk portion of the tobacco stalk to be speared by the stick. Concurrent with this spearing of the stalk-cut tobacco stalk, the endless belt is caused to move forward up to a distance which corresponds to one stroke of the movable member. After being advanced in this manner, the movable member is moved back to the original position while allowing the endless belt to be kept stopped at the advanced position. Likewise, the next stalk-cut tobacco stalk is speared by the stick, and at the same time, the endless belt is again caused to move forward up to a distance which corresponds to one stroke of the movable member. This operation is repeated a required number of times, thereby finishing the operation of stick-spearing a required number (usually about 8) of tobacco stalks to one stick.

In this stick-spearing operation of tobacco stalks, when the endless belt is moved in the next stick-spearing operation of tobacco stalk, the preceding stalk-cut tobacco stalk(s), if any, that has already been speared by said stick is caused to slide forward along the stick as it is pushed from the back thereof by means of said stalk-transferring claws attached to the endless belt. Therefore, the preceding stalk-cut tobacco stalk(s) that has already been speared by said stick is caused to advance by a constant distance along the stick by simply allowing the movable member of the actuator to reciprocatively move a predetermined distance (corresponding to one stroke) constantly. This predetermined distance can be determined by an effective length of stroke of the movable member and by the intervals of the stalk-transferring claws attached to the endless belt.

Preferably, a plurality of the stalk-transferring claws should be attached to the endless belt at equal intervals, thereby making it possible to easily and reliably array and secure a plurality of the stick-spearing stalk-cut tobacco stalks onto the stick at a constant pitch without necessitating the employment of special controlling mechanism. The effective stroke length of the movable member of the actuator may be the same as the interval between the neighboring tobacco stalks to be arranged on the stick, thereby making it possible to minimize the total moving distance of the movable member of the actuator, which is required for spearing a required number of tobacco stalks per stick and to enable the movable member to move at a high speed. As a result, the stick-spearing operation can be accomplished within a shorter period of time as compared with the conventional apparatus.

Preferably, the stalk-transferring claws may be attached to the endless belt with the positions of the stalk-transferring claws being made variable along the circumference of the endless belt. The effective stroke length of the movable member of the actuator may be also made variable. When the stalk-transferring claws and the movable member are constructed in this manner, the hanging intervals of the stick-spearing stalk-cut tobacco stalks to be speared by the stick can be made adjustable, thereby making it possible to change the number of stalk-cut tobacco stalks to be speared by a single stick. This adjustment of hanging intervals will be performed depending on the degree of wilt of leaves of tobacco stalks on the occasion of attaching the tobacco stalks to the stick. For example, when the tobacco leaves of the tobacco stalks that have been highly wilted in a standing state thereof by making use of a saw in field are to be treated in this curing works, the hanging intervals of the tobacco stalks may be narrowed more or less, thus making it possible to attach about eight tobacco stalks to a single stick, without inviting the generation of moldy leaves or damaged leaves. Whereas, when the tobacco stalks having non-wilted tobacco leaves have been reaped, the hanging intervals of the tobacco stalks should be enlarged more or less, and hence, only about six tobacco stalks can be attached to a single stick, since narrower spearing intervals would lead to the generation of moldy leaves or damaged leaves.

In a preferred embodiment of the apparatus according to this invention, various kinds of detecting means (sensors) may be employed for smoothly performing the stick-spearing operation of tobacco stalks, whereby it is made possible to interlock the movement of the actuator or the holding or releasing movement of the stick rear end-holding means with the movement of setting the stalk-cut tobacco stalk or with the movement of mounting a stick on the stick-supporting claws. As a result, the continuous and safe operation of the apparatus can be ensured.

DETAILED DESCRIPTION OF THE INVENTION

Preferably embodiments of the apparatus for stick-spearing stalk-cut tobacco stalks according to the present invention will be explained with reference to the drawings.

Figure 1:
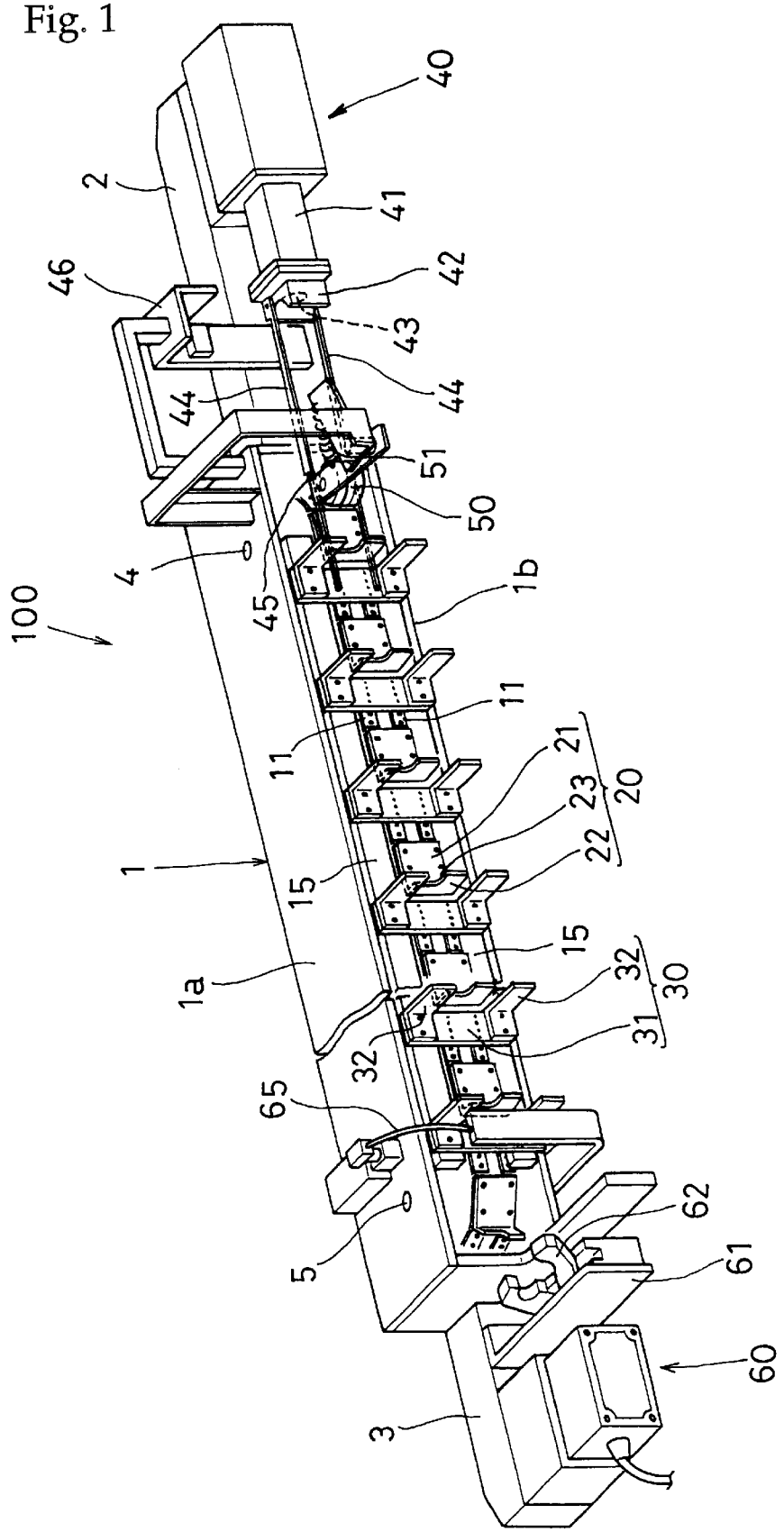
FIG. 1 is a perspective view showing the entire structure of the stick-spearing apparatus according to the present invention.
Figure 2:
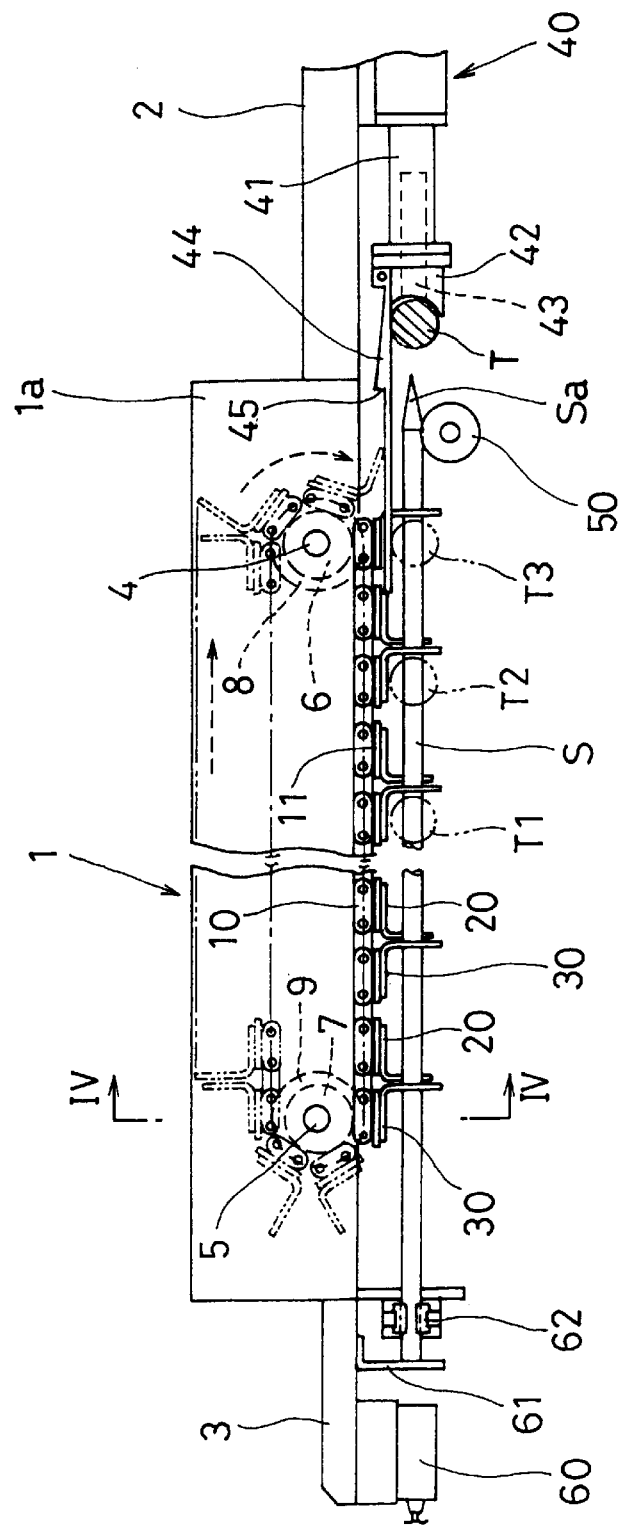
FIG. 2 is a plan view of the apparatus shown in FIG. 1, wherein a state where a stick is held in place and tobacco stalks are not yet fed thereto are shown.
Figure 3:
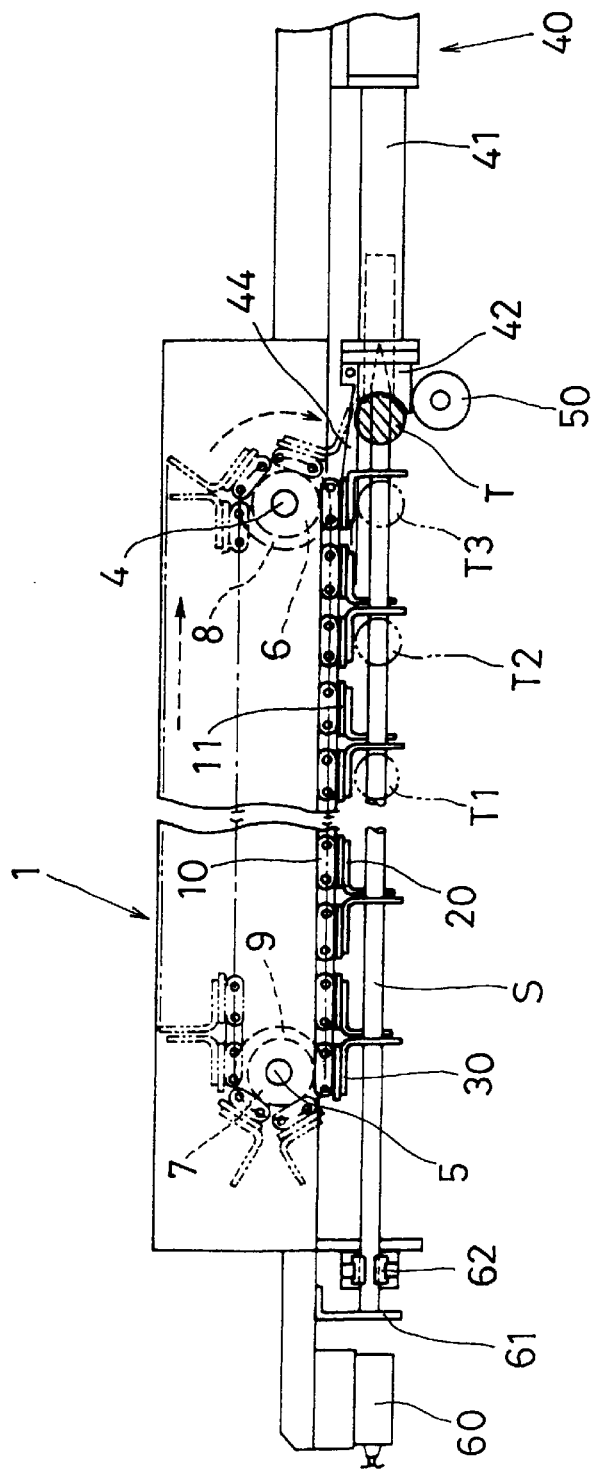
FIG. 3 is a plan view of the apparatus shown in FIG. 1, wherein a state where a stick is held in place and tobacco stalks have been speared thereto are shown.
Figure 4:
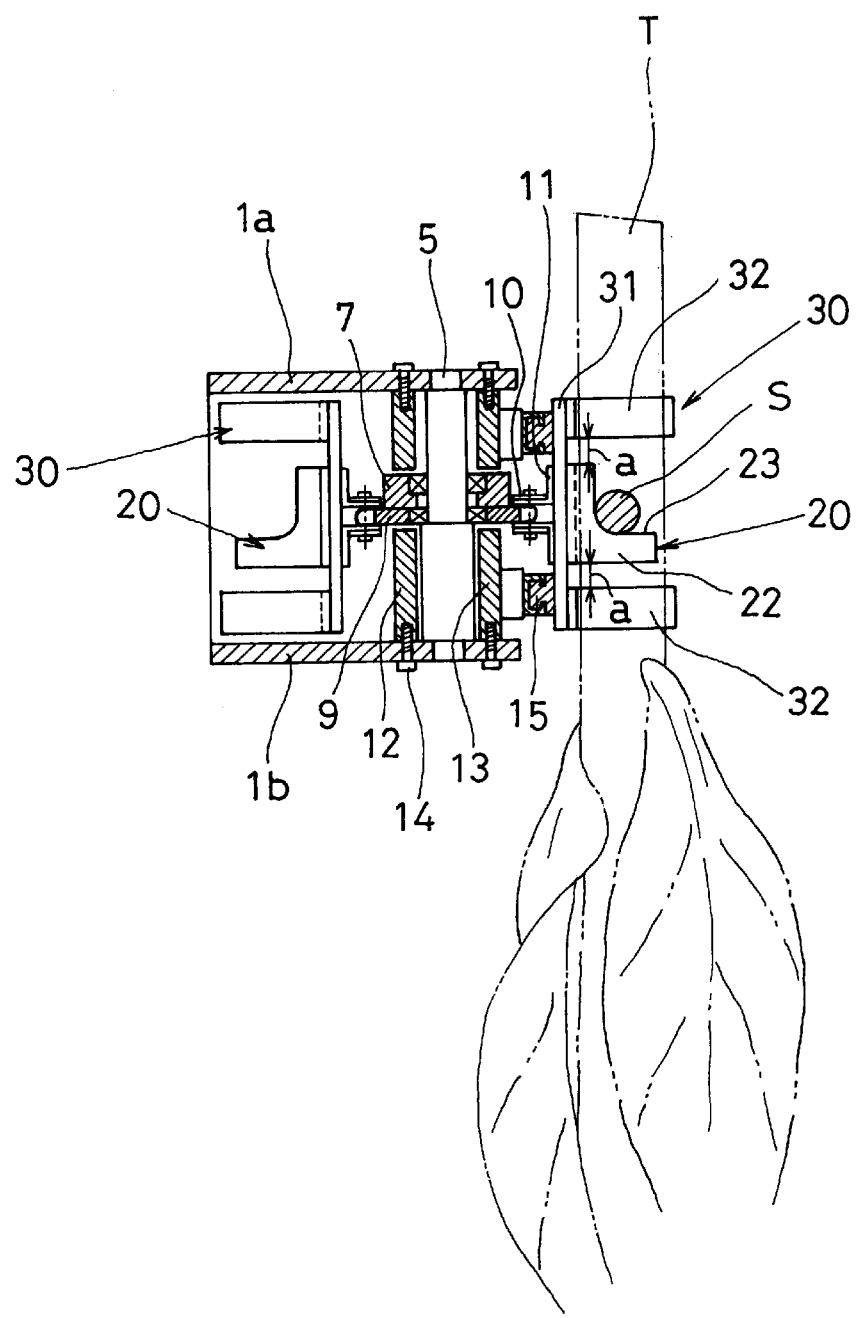
FIG. 4 is cross-sectional view taken along the line IV—IV in FIG. 2.
Figure 5:
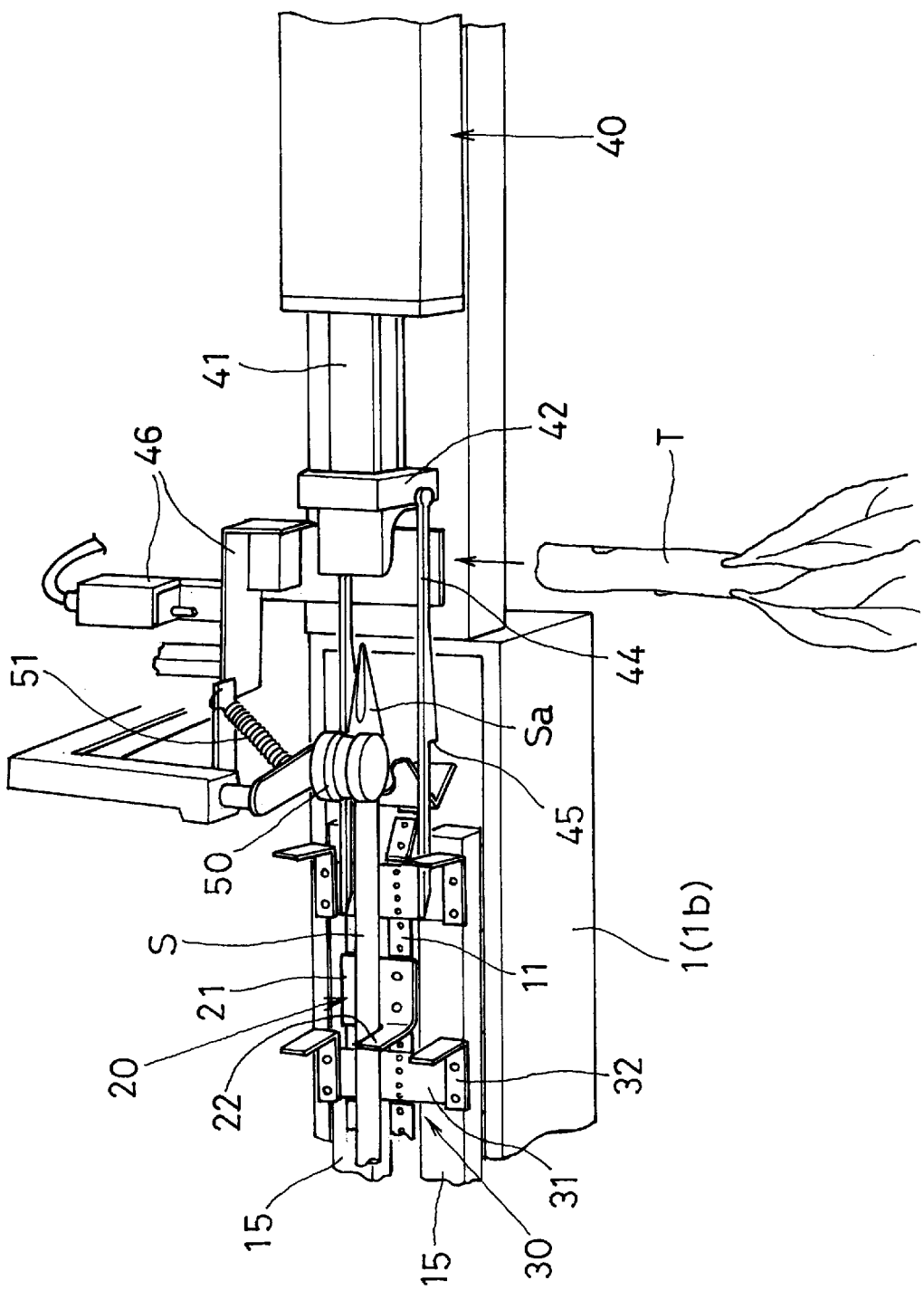
FIG. 5 is an enlarged perspective view illustrating a portion of the apparatus where an actuator provided with a movable piston is located.
Figure 6:
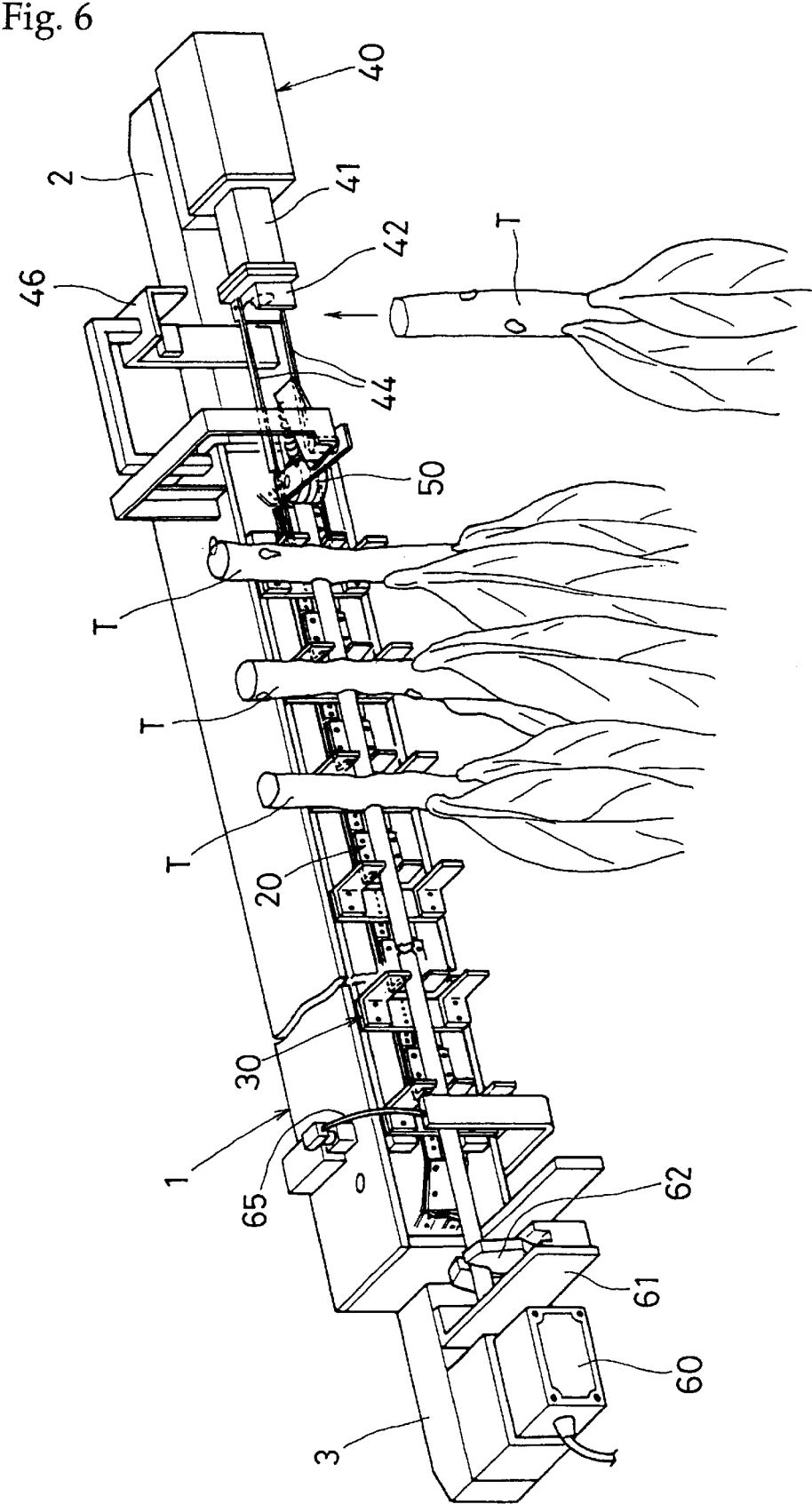
FIG. 6 is a perspective view illustrating a state where a stick-spearing apparatus is being operated.
Figure 7:
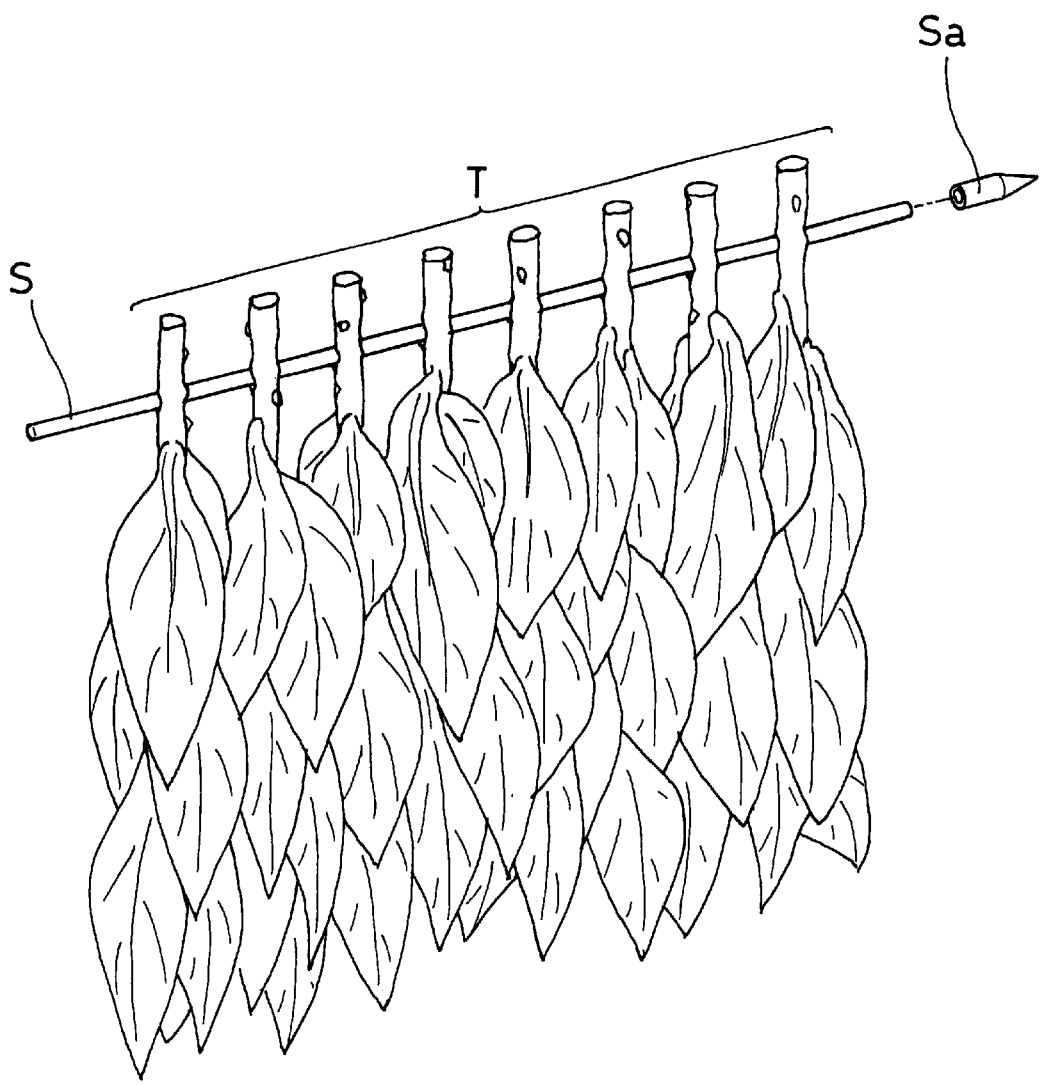
FIG. 7 is a perspective view showing a state where a required number of tobacco stalks are speared by a stick.

FIG. 1 is a perspective view showing the entire structure of the stick-spearing apparatus according to the present invention; FIGS. 2 and 3 respectively illustrates a plan view of the apparatus shown in FIG. 1, wherein two different states of the stick held in place are shown; FIG. 4 is cross-sectional view taken along the line IV—IV in FIG. 2; FIG. 5 is an enlarged perspective view illustrating a portion of the apparatus where an actuator provided with a movable piston is located; FIG. 6 is a perspective view illustrating a state where a stick-spearing apparatus is being operated; and FIG. 7 is a perspective view showing a state where a required number of tobacco stalks are speared by a stick.

Referring to these FIGS., the stick-spearing apparatus 100 comprises a main frame 1 having a width of about 120 cm, a fore-frame 2 attached to the fore-end of the main frame 1, and a rear-frame 3 attached to the rear-end of the main frame 1. The main frame 1 is provided with a top plate 1a and a bottom plate 1b, and also provided near the both ends thereof with a pair of supporting pillars 4 and 5. To these supporting pillars 4 and 5 are rotatably mounted, through a pair of bearings 6 and 7, a pair of sprockets 8 and 9, respectively. The distance between these supporting pillars 4 and 5 is set to about 90 cm. A transferring chain 10 formed of an endless belt is disposed in such a manner that it is engaged with the outer circumferences of these sprockets 8 and 9, and that one side thereof constituting a transporting surface is exposed from one side of the main frame 1. This transferring chain 10 is provided, all over the entire outer circumference thereof, with a plurality of stick-supporting claws 20 and a plurality of stalk-transferring claws 30 (to be explained in detail hereinafter), which are attached at equal intervals via angle members 11 to the transferring chain 10 and fastened by means of screws.

The stick-supporting claws 20 are respectively consisted of a fastening portion 21 and an upright portion 22 having, at the top thereof, an L-shaped cut-out portion 23. This stick-supporting claws 20 are respectively fastened, through the fastening portion 21, to the angle members 11. Further, the cut-out portion 23 is designed to support a stick S having a length of about 120 cm as explained in detail hereinafter.

The stalk-transferring claws 30 are respectively consisted of a fastening member 31 and a pair of L-shaped claw members 32 which are fastened respectively to the upper and lower end portions of the fastening member 31. This couple of claw members 32 are arranged in such a manner that one of them is positioned higher than the upper edge of stick-supporting claw 20, while the other is positioned lower than the lower edge of stick-supporting claw 20, thereby leaving a small gap "a" between each of the claw members 32 and each of the angle members 11 as shown in FIG. 4. Each of the claw members 32 is laterally extended longer than the distal end of the upright portion 22 of the stick-supporting claw 20. The stalk-transferring claws 30 are respectively fastened, through the fastening member 31, to the angle members 11. As explained hereinafter, the couple of claw members 32 function to pushingly transfer the stalk portions of stalk-cut tobacco stalks that have been speared by the stick S toward the downstream side of the stick S.

As shown in FIGS. 2 and 3, the transferring chain 10 is provided, all over the entire outer circumference thereof, with the stick-supporting claws 20 and the stalk-transferring claws 30 at equal intervals (usually, about 12 cm), and some of these claws 20 and 30, e.g. preferably about 8 of the stick-supporting claws 20 and about 8 of the stalk-transferring claws 30 are permitted to be exposed through one side of the main frame 1 where the transporting surface of the transporting chain 10 located between a pair of supporting pillars 4 and 5 is exposed.

Between the top plate 1a and the bottom plate 1b of the main frame 1, there are disposed reinforcing/guiding plates 12 and 13, which are positioned on both sides of each of the supporting pillars 4 and 5 and fastened thereto by means of screws 14. The lateral width of these reinforcing/guiding plates 12 and 13 is almost the same as the distance between the supporting pillars 4 and 5. Further, portions in the neighborhood of the supporting pillars 4 and 5 are respectively cut out so as to permit the sprockets 8 and 9 to pass therethrough. The reinforcing/guiding plate 13 which is located on the open side of the main frame 1 is designed to function as a back-up member on the occasion of moving the stick-supporting claws 20 and the stalk-transferring claws 30. Namely, as shown in FIG. 4, the reinforcing/guiding plate 13 is attached, almost throughout the entire length thereof, with a back-up member 15 having a height sufficient to contact with the back surface of the fastening member 31 of the stalk-transferring claw 30, thereby preventing the stalk-transferring claws 30 from moving backward as a whole. Although not shown in these drawings, the same kind of back-up member 15 is disposed with respect to the stick-supporting claws 20.

The fore-frame 2 is provided with an air cylinder device 40 functioning as an actuator, wherein the movable piston 41 thereof is designed to be reciprocatively moved predetermined distance at the same height as that of the transporting chain 10 and along in parallel with the transporting surface of the transporting chain 10. The movable piston 41 has a hollow distal end portion to which a pushing member 42 having a vertically grooved front surface is attached. This pushing member 42 is also provided with a through-hole 43 and positioned at almost the same height as that of the stick-supporting claws 20. Alternatively, the front surface of the pushing member 42 may be made flat.

The distance between the front surface of the pushing member 42 and the distal end of the transporting chain 10 as the movable piston 41 is retracted to the rearmost position thereof is set to about 20 cm. A couple of transferring bars 44 are disposed close to the fore-frame 2, one of them being positioned higher than the pushing member 42 and the other being positioned lower than the pushing member 42. Specifically, this couple of transferring bars 44 are pivotally attached to the pushing member 42, thus permitting them to horizontally rotate, and are always urged by a suitable means to move toward the fore-frame 2. The length of the transferring bars 44 is set to such that when the movable piston 41 is retracted to the rearmost position thereof, the distal end thereof can reach the upstream end of the transporting surface of the transporting chain 10. Further, the transferring bars 44 are respectively provided with a cut portion 45 at an intermediate portion of the side wall facing the fore-frame 2. Accordingly, the distal ends of this couple of transferring bars 44 can be placed on the transporting surface of the transporting chain 10 even when the movable piston 41 is retracted to the rearmost position thereof. Namely, this couple of transferring bars 44 can be kept in a state where the distal ends thereof are permitted to pass through the gap "a" formed between the claw member 32 of the fastening member 31 and the upright portion 22 of the stick-supporting claw 20, thus enabling the transferring bars 44 to extend to the downstream of the transporting chain 10 (a state shown in FIG. 2).

When the movable piston 41 is advanced through the actuation of the air cylinder device 40 by making use of a control mechanism (not shown), the couple of transferring bars 44 are allowed to move forward up to a distance corresponding to the width of stroke of the air cylinder device 40. During this advancing movement of the transferring bars 44, the cut portions 45 formed on the transferring bars 44 are engaged with the side wall on the upstream side of the fastening member 31, thus enabling the fastening member 31 to simultaneously move toward the downstream side of the transporting chain 10. As a result, the transporting chain 10 is permitted to advance up to a distance corresponding to the width of the stroke of the movable piston 41 which is permitted to take place after the cut portions 45 formed on the transferring bars 44 are engaged with the side wall on the upstream side of the fastening member 31 of the stalk-transferring claw 30 (a state shown in FIG. 3). Subsequently, even if the movable piston 41 is moved back to the original retracted position, the transporting chain 10 is kept stopped at this advanced position. Through these movements, the forward movement of a constant distance of the transporting chain 10 is repeated at every stroke of the movable piston 41.

A sensor 46 for detecting the presence of tobacco stalk T by sensing a pressure to be brought about by the proximal end portion of the tobacco stalk T is disposed over a place which is located slightly upstream as measured from the position of the movable piston 41 of the air cylinder device 40 when the movable piston 41 is retracted to the rearmost position thereof. As a signal is transmitted from this sensor 46 to the air cylinder device 40, the air cylinder device 40 is actuated to move one stroke.

A grooved roller 50 for sustaining the posture of a distal end portion of the stick S mounted on the stick-supporting claws 20 is disposed at a place which is located slightly closer to the air cylinder device 40 as measured from the upstream end of the transporting chain 10. This grooved roller 50 is urged toward the main frame 1 by means of a spring 51, so that when the tobacco stalk T or the movable piston 41 passes beyond the grooved roller 50, the grooved roller 50 can be retracted to the opposite side, and when the tobacco stalk T or the movable piston 41 has passed beyond the grooved roller 50, the grooved roller 50 can be returned back to the original position.

The rear frame 3 is provided with a pressure sensor 60 having an actuating plate 61. Further, the rear frame 3 is also provided with an air chuck 62 for holding the rear end of the stick S to be mounted on the stick-supporting claw 20 at this rear-frame portion, the air chuck 62 being positioned so as to align with a virtual line passing through the cut-out portions 23 formed in the upright portion 22 of the stick-supporting claw 20. The air chuck 62 is normally kept in an opened state as shown in FIG. 1, but when the stick S is mounted on the stick-supporting claw 20 and then, the rear end of stick S is pushed down by the actuating plate 61, the pressure sensor 60 is actuated so as to close the air chuck 62. Furthermore, the main frame 1 is provided at the rear end thereof with a sensor 65 for detecting the reaching of the tobacco stalk that has been initially speared by the stick S to the vicinity of rear end portion of the stick S, so that the air chuck 62 is enabled to be opened as it receives a signal from the sensor 65.

Next, the operation of this apparatus will be explained. First of all, a stick S is mounted on the cut-out portions 23 of the stick-supporting claws 20 attached to the transporting chain 10, and the rear end of the stick S is pressed onto the actuating plate 61 attached to the rear-frame 3. As a result, the rear end of the stick S is held by the air chuck 62 and kept in a fixed state in the stick-spearing apparatus. At this moment, the distal end of the stick S is kept pressed onto the main frame 1 by means of the grooved roller 50, and at the same time, the movement of the stick S in the vertical direction is restricted by the upper stalk-transferring claw 30 and the cutout portion 23. Under this condition, an arrowhead member Sa having a sharp distal end is attached to the tip end of the stick S (a state shown in FIG. 2).

Thereafter, a stalk-cut tobacco stalk turned upside down is held by an operator, and the proximal end of the tobacco stalk is lifted upward in front of the movable piston 41 of the air cylinder device 40 with the movable piston 41 being kept at the retracted position (a state shown in FIG. 5). Under this condition, the presence of the tobacco stalk T is detected by the tobacco stalk-detecting sensor 46, and a signal indicating this detection is transmitted to the controlling mechanism. Thereafter, an actuator-actuating signal is transmitted from this controlling mechanism so as to actuate the air cylinder device 40, thereby enabling the movable piston 41 to move forward. As the movable piston 41 is moved forward in this manner, the tobacco stalk T is also caused to move forward together with the pushing member 42, thereby enabling the arrowhead member Sa attached to the stick S to spear through the stalk portion of the tobacco stalk T. When the movable piston 41 is further moved forward, the tobacco stalk T can be further speared by the stick S (a state shown in FIG. 3). Under this condition, the pushing member 42 is moved back to the original position. As described above, as the pushing member 42 is moved forward, the cut portions 45 formed on the transferring bars 44 are enabled to be engaged with the side wall on the upstream side of the fastening member 31 of the stalk-transferring claw 30, thus enabling the transporting chain 10 to move forward up to a predetermined distance. At this stage, the transporting chain 10 is only caused to move forward.

Thereafter, the next stalk-cut tobacco stalk (the same after the second one) is set in place by an operator so as to be speared by the stick S. Simultaneous with this stick-spearing movement, the transporting chain 10 is caused to move forward in the same manner as described above. On this occasion however, the claw members 32 of the stalk-transferring claws 30 that have been transferred together with the forward movement of the transporting chain 10 are functioned to push the back side of tobacco stalk T that has been introduced previously into the stick S, thereby enabling this preceding tobacco stalk T to advance over the stick S up to the distance corresponding to the moved distance of the transporting chain 10 (see FIG. 6 and FIGS. 2 and 3 wherein the tobacco stalks T1–T3 are indicated by a phantom line). Thereafter, the aforementioned operation is repeated.

On this occasion, when the intervals of the stalk-transferring claws 30 is made identical with the width of the stroke of the movable piston 41 which is permitted to take place after the cut portions 45 formed on the transferring bars 44 are engaged with the side wall on the upstream side of the fastening member 31 of the stalk-transferring claw 30 located at the uppermost stream side, a plurality of tobacco stalks T that have been speared by the stick S can be easily slid over the stick S with the intervals of the stalk-transferring claws 30 being kept maintained. If it is desired to change the hanging intervals depending on the degree of wilts of leaves of tobacco stalks T, it can be easily changed by adjusting the position or intervals of the stalk-transferring claws 30 to be attached to the angle members 11 and at the same time, by employing the transferring bars 44 having the cut-out portions 45 whose position is adjusted to correspond with the intervals adjusted of the stalk-transferring claws 30.

When the spearing of predetermined number (for example, eight) of tobacco stalks T has been finished, the tobacco stalk T that has been initially speared is detected by the sensor 65. As a result, the holding of the rear end portion of the stick S by means of the air chuck 62 is released. The operator may be informed of this release of holding through a suitable signal (such as sound or light). Thereafter, the finished stick S spearing a predetermined number of tobacco stalks T at a predetermined intervals (FIG. 7) is removed from the transporting chain 10 by the operator and transferred to a predetermined site. Then, the next stick S is again fixed to the transporting chain 10 in the same manner as explained above, thus repeating the same procedures. The stick S spearing a predetermined number of tobacco stalks T is subsequently transported to a curing barn and hanged from a hanging frame of the curing barn, thus performing the curing of the leaves of the tobacco stalks T.

In the foregoing explanation, only preferable embodiments of the stick-spearing apparatus for stalk-cut tobacco stalks have been discussed. However, the present invention is not limited to the aforementioned embodiments, but the apparatus according to the present invention can be modified in various manners. For example, in the foregoing explanation, the movable member of the actuator is constructed by integrally attaching the pushing member 42 to the distal end of the movable piston 41. However, the pushing member 42 may be disposed separate from the movable piston 41, thereby enabling on the pushing member 42 to be advanced toward the tobacco stalks T prior to the forward movement of the movable piston 41. When the pushing member 42 is constructed in this manner, the spearing of tobacco stalks T to the distal end of the sticks S can be further stabilized.

Figure 8:
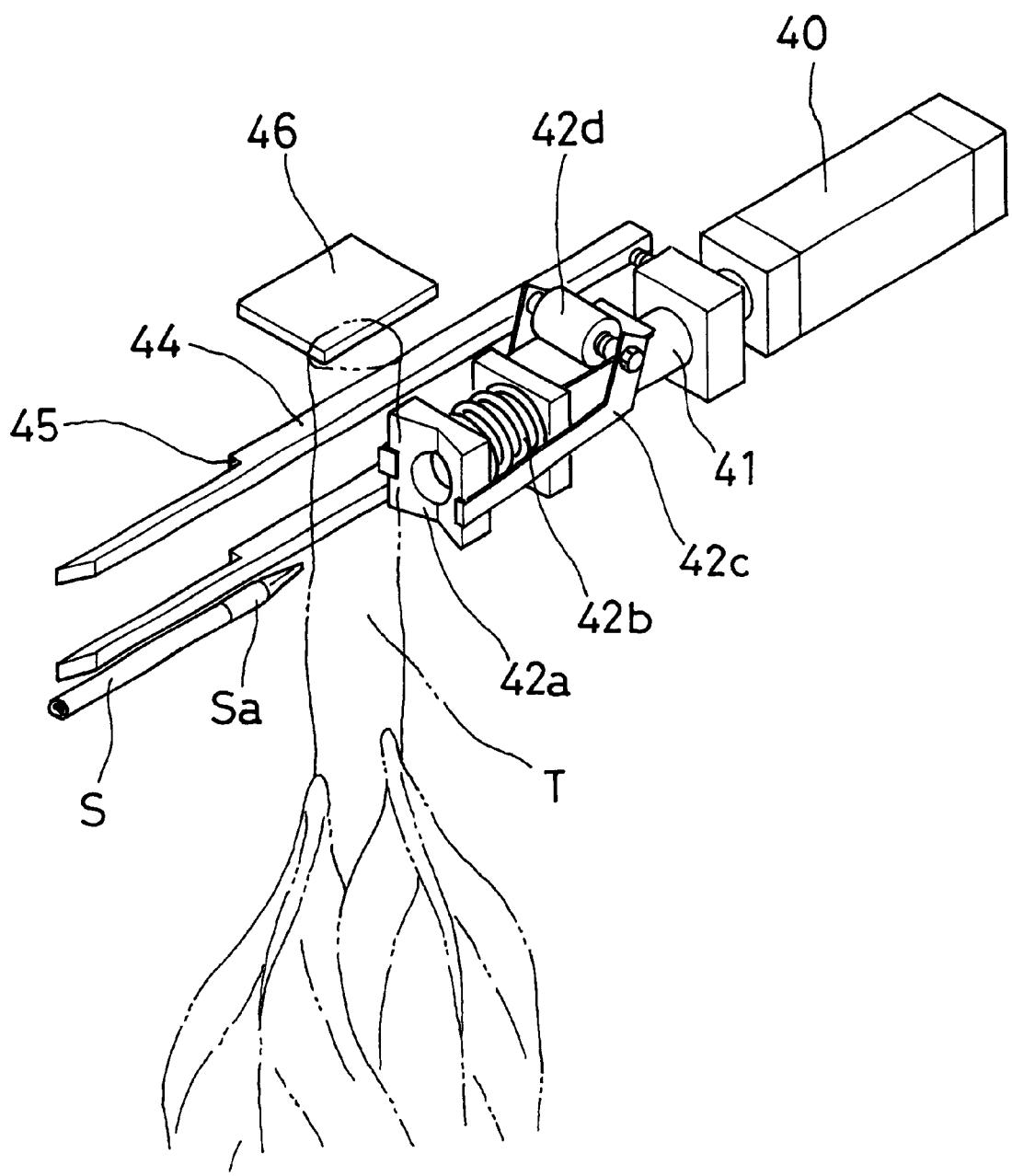
FIG. 8 is a perspective view illustrating another embodiment of actuator provided with a movable piston.

FIG. 8 shows one example of such a construction. In this case, the pushing member 42 is slidably disposed through a guiding rod (not shown) in front of the distal end of the movable piston 41 with a coil spring 42b being interposed therebetween, thereby enabling the pushing member 42 to move back and forth. The pushing member 42 is engaged with the distal ends of the right and left arms 42c supported by the movable piston 41, thereby enabling the pushing member 42 to be integrally held by the arms 42c while allowing the pushing member 42 to be always urged to move forward. The rear ends of the right and left arms 42c are linked to the movable portion of a solenoid valve 42d which is fixed to the movable piston 41, so that the distance between distal ends of the right and left arms 42c can be temporarily widened through the actuation of the solenoid valve 42d, thereby releasing the engagement between the distal ends of the right and left arms 42c and the pushing member 42.

In the case of this construction, when the proximal end portion of the tobacco stalk T is contacted with the tobacco stalk-detecting sensor 46, a signal for the actuation of the solenoid valve 42d is emitted through a control mechanism, thereby releasing the engagement between the distal ends of the right and left arms 42c and the pushing member 42. As a result, the pushing member 42 can be quickly moved forward due to the resiliency of the coil spring 42b so as to allow the stalk portion of the tobacco stalk T to be speared by the stick S.

The control mechanism is also constructed such that a signal for the actuation of the air cylinder device 40 is emitted concurrent with or somewhat later than the signal for the actuation of the solenoid valve 42d, thereby allowing the movable piston 41 to move forward. Due to this forward movement of the movable piston 41, the tobacco stalk T is caused to further advance along the stick S, and at the same time, the movable piston 41 is moved forward in relative to the location of the pushing member 42, thereby enabling the distal ends of the arms 42c to be re-engaged with the pushing member 42, thus integrating them again. Under this condition, the movable piston 41 is moved back to the original position and kept in a state waiting for the next signal.

According to this construction, since the pushing member 42 is enabled to quickly move forward concurrent with the setting of the tobacco stalk T, the spearing of tobacco T can be stabilized, and at the same time, since a time lag is allowed between the spearing step and the subsequent forward-pushing step, the stick-spearing operation can be smoothly executed using a hydraulic cylinder device exhibiting a large working pressure in place of the air cylinder device 40.

By the way, although not shown in FIG. 8, the means for urging the pushing member 42 to move forward may be constituted by the means where a weight is employed to urge the pushing member 42 to move forward instead of using the aforementioned coil spring 42b. Further, instead of utilizing the engagement and release between the solenoid valve 42d and the arms 42c, the means for retaining the position of the pushing member 42 may be constituted by a structure wherein an endless belt is disposed along the moving locus of the pushing member 42 so as to allow the pushing member 42 to be held at a retracted position through an engagement thereof with an engaging member attached to this endless belt, and when the endless belt is rotated rearward upon receiving a signal from the control mechanism, the engagement is released, thereby permitting the pushing member 42 to move forward by the force of spring until the pushing member 42 is stopped from moving due to the re-engagement thereof with the engaging member attached to the endless belt, the pushing member 42 being subsequently forcedly returned back to the original position through the backward rotation of the endless belt. In this case, the reciprocative movement of the pushing member 42 can be effected by the rotational movement of the endless belt, so that the work space can be reduced as compared with the stick-spearing mechanism utilizing the reciprocative movement of a cylinder.

As explained above, according to the stick-spearing apparatus for stalk-cut tobacco stalks of the present invention, an air cylinder device or an actuator having a movable member which is designed to reciprocatively move a predetermined distance is employed as a motive power for spearing a stick through a tobacco stalk, it is possible to obtain a sufficiently strong instantaneous spearing force and to concurrently perform, through the movement of the movable member, the stick-spearing operation and the transferring operation of a plurality of tobacco stalks that have already been speared by a stick. Therefore, the apparatus can be made more compact as compared with the conventional apparatus in spite of the fact that the apparatus according to the present invention is of a type where the stick-spearing is performed while fixing the stick to the apparatus.

Further, according to the stick-spearing apparatus of the present invention, the stand-by time for the stick-spearing of the next tobacco stalk is always constant, so that an operator can perform the spearing work under a stable condition. Moreover, since the total moving distance of the pushing member which is required for spearing a predetermined number of tobacco stalks per stick can be shortened as compared with that of the prior art, the stick-spearing work can be finished within a shorter period of time, thus improving the working efficiency.

Since the tobacco stalks that have been speared on a stick is arrayed at a constant pitch, the re-adjustment of the intervals of tobacco stalks can be dispensed with. Further, the change of intervals of tobacco stalks can be easily performed, so that the intervals of tobacco stalks can be easily set so as to suit it to the harvesting method of the stalk-cut tobacco stalks or to the degree of wilt of the tobacco leaves thereof. It is possible, by mounting this apparatus on a vehicle which is capable of being operated in a field, to perform the reaping work in parallel with the stick-spearing work. Further, the sticks spearing the tobacco stalks can be collectively transported to a curing barn and hanged on the hanging frames of the curing barn for performing the curing of the leaves of the tobacco stalks. As a result, the hanging operation of the tobacco stalk can be also simplified as a whole.

What is claimed is:

1. An apparatus for stick-spearing stalk-cut tobacco stalks which comprises;

an endless belt rotatably wound around a frame and provided along a circumferential surface thereof with a plurality of stick-supporting claws and a plurality of stalk-transferring claws;

a stick rear end-holding means for fixing a rear end of the stick supported by said stick-supporting claws to said frame; and an actuator provided with a movable member which can be reciprocatively moved a predetermined distance while retaining a parallel state thereof with said stick supported by said stick-supporting claws;

wherein said actuator is designed to be operated in such a way that when said movable member is advanced toward said stick supported by said stick-supporting claws, said stalk-cut tobacco stalk is pushingly transferred allowing a stalk portion of said stalk-cut tobacco stalk to be speared by a distal end of said stick and at the same time, said endless belt is caused to move forward up to a predetermined distance, thereby enabling the preceding stalk-cut tobacco stalk(s), if any, that has already been speared by said stick to advance up to a predetermined distance by means of said stalk-transferring claws.

2. The apparatus according to claim 1, which further comprises a grooved roller for sustaining the posture of a distal end portion of said stick held by said stick-supporting claws.

3. The apparatus according to claim 1, wherein said plurality of the stalk-transferring claws are attached to said endless belt at equal intervals, thereby enabling said stick-spearing stalkcut tobacco stalks to be arrayed at a constant pitch.

4. The apparatus according to claim 1, wherein the stalk-transferring claws are attached to the endless belt with the positions of said stalk-transferring claws being made variable along the circumference of the endless belt.

5. The apparatus according to claim 1, which further comprises a detecting means for detecting the placement of a stalk-cut tobacco stalk to a predetermined position in a process of stick-spearing the tobacco stalk, a signal from said detecting means indicating said placement of tobacco stalk being transmitted to said actuator, thereby enabling said actuator to operate.

6. The apparatus according to claim 1, which further comprises a detecting means for detecting the mounting of said stick on a predetermined position, a signal from said detecting means indicating said mounting of said stick being transmitted to said stick rear end-holding means, thereby enabling said stick rear end-holding means to initiate a holding work.

7. The apparatus according to claim 1, which further comprises a detecting means for detecting the finishing of stick-spearing of a required number of said stalk-cut tobacco stalks on said stick, a signal from said detecting means indicating said finishing of stick-spearing being transmitted to said stick rear end-holding means, thereby enabling said stick rear end-holding means to initiate a releasing work.

* * * * *